United States Patent [19]
Wang et al.

[11] Patent Number: 5,994,468
[45] Date of Patent: Nov. 30, 1999

[54] HIGH DAMPING GELS DERIVED FROM NYLON GRAFTED POLYMERS

[75] Inventors: Xiaorong Wang; Victor J. Foltz, both of Akron; James E. Hall, Mogadore, all of Ohio; Naruhiko Mashita, Yokohama; Hideo Takeichi, Kodaira, both of Japan

[73] Assignee: Bridgestone Corporation, Tokyo, Japan

[21] Appl. No.: 09/073,788

[22] Filed: May 6, 1998

[51] Int. Cl.[6] .............................. C08F 8/30; C08F 26/06; C08L 77/00; C08K 5/01; C08J 3/00
[52] U.S. Cl. ...................... 525/178; 524/474; 524/484; 524/490; 524/296; 524/297; 525/66; 525/69; 525/73; 525/74; 525/77; 525/178; 525/182; 525/183; 525/190; 525/326.7; 525/326.8; 525/327.4; 525/327.6; 525/420; 525/422; 525/426
[58] Field of Search ................................. 525/66, 69, 73, 525/74, 77, 178, 182, 183, 190, 326.7, 326.8, 327.4, 327.6, 420, 422, 426; 524/474, 484, 490, 296, 297

[56] References Cited

U.S. PATENT DOCUMENTS

| | | |
|---|---|---|
| 3,652,726 | 3/1972 | Nield et al. . |
| 3,676,404 | 7/1972 | Nield . |
| 3,766,142 | 10/1973 | Nield et al. . |
| 4,039,734 | 8/1977 | Hendy . |
| 4,374,951 | 2/1983 | Lee et al. . |
| 4,381,373 | 4/1983 | Ikuma . |
| 4,528,326 | 7/1985 | Dean . |
| 4,605,700 | 8/1986 | Le-Khac . |
| 4,683,275 | 7/1987 | Kato et al. . |
| 4,874,829 | 10/1989 | Schwier et al. . |
| 4,879,343 | 11/1989 | Aoki et al. . |
| 4,914,138 | 4/1990 | Percec et al. . |
| 4,919,925 | 4/1990 | Ueda et al. . |
| 4,938,669 | 7/1990 | Fraser, Jr. et al. . |
| 4,954,571 | 9/1990 | Iwamoto et al. . |
| 5,028,651 | 7/1991 | Park et al. . |
| 5,066,742 | 11/1991 | Gupta . |
| 5,091,470 | 2/1992 | Wolsink et al. . |
| 5,136,052 | 8/1992 | Van Gysel et al. . |
| 5,244,971 | 9/1993 | Jean-Marc . |
| 5,424,380 | 6/1995 | Doi . |
| 5,541,259 | 7/1996 | Doi ......................................... 525/175 |
| 5,650,466 | 7/1997 | Gottschalk et al. . |

FOREIGN PATENT DOCUMENTS

| | | |
|---|---|---|
| 0 322 905 | 12/1988 | European Pat. Off. . |
| 0 455 506 A1 | 5/1991 | European Pat. Off. . |
| 42 41 538 A1 | 6/1994 | Germany . |
| 59-027943 | 2/1984 | Japan . |
| 05345853 | 12/1993 | Japan . |
| 6-248017 | 9/1994 | Japan . |

*Primary Examiner*—Patrick D. Niland
*Attorney, Agent, or Firm*—Daniel N. Hall; David G. Burleson; Aaron B. Retzer

[57] ABSTRACT

The instant invention teaches a method for enabling the formation of a high damping, soft polymer gel. The method includes: reacting a poly(maleimide-co-alkenyl benzene) polymer with a nylon and an alkyl diamine under substantially dry conditions sufficient to form a nylon grafted poly(maleimide-co-alkenyl benzene) polymer product; and, dispersing the nylon grafted poly(maleimide-co-alkenyl benzene) polymer product with an extender oil sufficient to form the gel. The instant invention also contemplates a polymer gel composition, a polymer composition and an article manufactured from the polymer gel composition.

18 Claims, No Drawings

HIGH DAMPING GELS DERIVED FROM NYLON GRAFTED POLYMERS

FIELD OF THE INVENTION

This invention relates to a grafted polymer of nylon and a poly(alkenyl benzene-(co)-(maleimide)) and to the use of such polymers when oil extended in producing high damping, soft materials.

BACKGROUND OF THE INVENTION

The polymerization of styrene and maleic anhydride by free radical initiation is well known in the prior art. Similarly, poly(styrene-co-maleic anhydride) polymer is well known. Further, imidization between a maleic anhydride and a primary amine group is a commonly known chemical reaction. Patent publications which have recognized these reactions include: German Patent DE 4241538, assigned to Leuna-Werke A.-G; Japanese Patent JP 94248017, assigned to Monsanto Kasel Kk.; and, Italian Patent EP 322905 A2, assigned to Montedipe S.p.A. Various other non-patent publications have also recognized these reactions. Included among them are: L. E. Colleman, Jr., J. F. Bork, and H. Donn, Jr., J. Org. Chem., 24, 185(1959); A. Matsumoto, Y. Oki, and T. Otsu, Polymer J., 23 (3), 201 (1991); L. Haeussler, U. Wienhold, V. Albricht, and S. Zschoche, Themochim. Acta, 277, 14(1966); W. Kim, and K. Seo, Macromol. Rapid Commun., 17 835(1996); W. Lee, and G. Hwong, J. Appl. Polym. Sci., 59, 599(1996); and, I. Vermeesch and G. Groeninckx, J. Appl. Polym. Sci., 53, 1356(1994).

The synthesis of monofunctional N-alkyl and N-aryl maleimides are also well known in the prior art. They have been extensively used to improve the heat stability of homo- and especially copolymers prepared from vinyl monomers. Typically, the bulk resins comprise ABS (poly(acrylonitrile-co-butadiene-co-styrene)) or a polyblend of poly (acrylonitrile-co-butadiene) and poly(styrene-co-acrylonitrile); PVC (poly(vinyl chloride)); SAN (poly (styrene-co-acrylonitrile)), PMMA (poly-(methyl methacrylate)); and the like. The maleimides can be copolymerized with other monomers such as acrylonitrile, butadiene, styrene, methyl methacrylate, vinyl chloride, vinyl acetate and many other comonomers. A more preferred practice in the industry is to produce copolymers of maleimides with other monomers such as styrene and optionally acrylonitrile and to blend these with ABS and SAN resins. In any event, the polymer compositions are adjusted so that the copolymers are fully compatible with the bulk resins (e.g., ABS and/or SAN) as shown by the presence of a single glass transition point ($T_g$) as determined by differential scanning calorimetry (DSC).

It has long been recognized that two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problem. Frequently, the two polymers are thermodynamically immiscible, which precludes generating a truly homogeneous product. This immiscibility may not be a problem per se since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

It is particularly desirable to prepare a grafted copolymer having the impact strength of polypropylene and the elastomeric properties of a block copolymer. It is also desireable to add an extender or plasticizer to the resultant grafted copolymer in order to obtain a copolymer having a low Shore A hardness.

OBJECTS OF THE INVENTION

Accordingly, it is an object of this invention to provide an oil or low molecular weight component extended nylon grafted polymer of a poly(maleimide-co-alkenyl benzene) that is useful in producing high damping and soft materials.

More specifically, it is an object of this invention to provide a grafted polymer formed by reacting nylon with a poly(maleimide-co-alkenyl benzene).

Another object of the invention is to provide oil or low molecular weight component extended nylon grafted polymers that exhibit improved properties, including low Shore A hardness less than 30, high damping properties and a service temperature of about 100° C.

SUMMARY OF THE INVENTION

The present invention is directed to an oil or low molecular weight component extended nylon grafted poly (maleimide-co-alkenyl benzene) polymer soft gel composition having damping properties useful in producing molded products having heat resistance and a high elasticity and damping property.

The present invention is broadly directed to grafted polymer compositions of a nylon and a poly(maleimide-co-alkenyl benzene). It is further directed to a process for preparing an oil extended grafted polymer compositions broadly comprising a nylon grafted to a functionalized thermoplastic polymer, namely a poly(maleimide-co-alkenyl benzene), under conditions sufficient to permit grafting of the nylon with the functionalized thermoplastic polymer. The grafted polymer is a glass-like material. Upon being oil-extended, the grafted polymers become soft and rubber-like elastomer.

DETAILED DESCRIPTION OF THE INVENTION

The extended grafted polymer gels of the present invention contain: 100 parts by weight of a grafted polymer of a poly(maleimide-co-alkenyl benzene) having at least one nylon segment grafted thereto through the at least one functional linkage formed by a crosslinking reaction; and 10 to 10,000, preferably 30 to 1000, parts by weight of an extender such as an oil or a low molecular weight component.

The poly(maleimide-co-alkenyl benzene) is a polymer formed by imidizing a poly(alkenyl benzene-co-maleic anhydride) with a primary amine. The polymer has a high molecular weight spine connected with many relatively short side chains formed from the condensation reactions of the primary amines and maleic anhydride. The length of the main chain usually equals or is longer than the entanglement length, which is herein defined theoretically as an order of magnitude of 100 repeating units, while the length of the side chains is much smaller than the entanglement length.

The preferred alkenyl benzenes contributed monomer units of the poly(maleimide-co-alkenyl benzene) polymer are either styrene or alpha-methylstyrene. The terms "alkenyl benzene" and "vinyl aromatic" are understood to be interchangeable as used herein.

The poly(maleimide-co-alkenyl benzene) described herein are subsequently graft-reacted through an imidization linkage to a nylon to yield a grafted polymer having at least one nylon segment grafted thereto through the at least one functional linkages thus formed.

The nylon may be any of the conventionally known nylon compounds that are produced by methods known in the art. The crystallinity of the nylon may vary from being substantially amorphous to being completely crystalline, that is from about 10–100% crystallinity. Most typically, the grafted nylon will be substantially crystalline, e.g., greater than about 90%. Suitable nylons (thermoplastic polyamides) may be crystalline or resinous, high molecular weight solid polymers including copolymers and terpolymers having recurring amide units within the polymer chain. Polyamides may be prepared by polymerization of one or more epsilon-lactams such as caprolactam, pyrrolidione, lauryllactam and aminoundecanoic lactam, or amino acid, or by condensation of dibasic acids and diamines. Both fiber-forming and molding grade nylons are suitable. Examples of suitable polyamides for use in the present invention include but are not limited to: polycaprolactam (nylon-6), polylauryllactam (nylon 12), polyhexamethyleneadipamide (nylon-6,6), polyhexamethyleneazelamide (nylon-6,9), polyhexamethylenesebacamide (nylon-6,10), polyhexamethylene isophthalamide (nylon-6, IP), polyhexamethyleneterephthalamide (nylon-6, TP) and the condensation product of 11-aminoundecanoic acid (nylon-11), as well as copolymers thereof, such as nylon-6-nylon-66 copolymer, nylon-6-nylon-12 copolymer and the like. Commercially available thermoplastic polyamides may be advantageously used in the practice of this invention, with linear crystalline polyamides having a softening point or melting point between 150° and 260° C. being preferred. The nylon or polyamide grafted segment or segments have molecular weights "$M_w$" of about 500 up to about 300,000, or higher, preferably about 1,000 to about 50,000.

The poly(maleimide-co-alkenyl benzene) of the present invention is formed by reacting a poly[alkenylbenzene-(co)-(maleic anhydride)] at about 120° C. to about 250° C. and from slightly above vacuum to about 20 atmospheres, under substantially dry conditions in the presence of a primary amine. The present invention is preferably directed to a polymer compositions of a poly(styrene-co-maleimide) formed by reacting a poly(styrene-co-maleic anhydride) with a primary amine. However, the maleic anhydride contributed monomer units are not totally reacted as less than 5% (minor amounts), preferably less than 3%, most preferably less than 1% (a trace) of the maleic anhydride contributed monomer units remain after reaction with the primary amine to provide grafting sites for subsequent graft reaction with a polyamide (nylon). Thus, in the following discussions, polymers identified as poly(maleimide-co-alkenyl benzene) or poly(styrene-co-maleimide) contain minor or trace amounts of maleic anhydride contributed monomer units useful in subsequent graft reactions.

For the purposes of this invention, poly(alkenyl benzene-co-maleimide) and poly(alkyl benzene-co-maleic anhydride) are defined to encompass random and stereo-specific copolymers, including copolymers having alternating alkenyl benzene and maleimide or maleic anhydride contributed monomer units along the polymer backbone. Such alternating structure are typically described as poly (alkenyl benzene-alt-maleimide) and poly(alkyl benzene-alt-maleic anhydride), however, these polymers are encompassed herein within the descriptions of poly(alkenyl benzene-co-maleimide) and poly(alkyl benzene-co-maleic anhydride).

Processes for forming poly(alkyl benzene-co-maleic anhydride) polymers are well known to those skilled in the art. The preparation of the copolymers from electron donor monomers, such as styrene, and electron acceptor monomers, such as maleic anhydride, as a result of complexation of the electron acceptor monomers may be carried out in the absence as well as in the presence of an organic free radical initiator in bulk, or in an inert hydrocarbon or halogenated hydrocarbon solvent such as benzene, toluene, hexane, carbon tetrachloride, chloroform, etc. (N. G. Gaylord and H. Antropiusova, Journal of Polymer Science, Part B, 7, 145 (1969) and Macromolecules, 2, 442 (1969); A. Takahashi and N. G. Gaylord, Journal of Macromolecular Science (Chemistry), A4, 127 (1970).

Poly(alkyl benzene-co-maleic anhydride) polymers are prepared by reacting monomers of alkenylbenzene with maleic anhydride. The preferred alkenyl benzene monomers used for forming the poly(alkyl benzene-co-maleic anhydride) polymer are styrene or α-methylstyrene. Suitable, but less preferred substitutes are: p-methylstyrene, 4-phenylstyrene, m-methylstyrene, o-methylstyrene, p-tert-butylstyrene, dimethylstyrene, and combinations thereof The poly(alkyl benzene-co-maleic anhydride) for use in the present invention is a polymer containing from about 5 to 99 mole percent of maleic anhydride monomer with the remainder being alkyl benzene monomer. The preferred poly(alkyl benzene-co-maleic anhydride) contains from 20 to 50 mole percent of maleic anhydride monomer. The most preferred poly(alkyl benzene-co-maleic anhydride) for use in the present invention is poly(styrene-co-maleic anhydride) containing 50 mole percent of maleic anhydride monomer and 50 mole percent of styrene monomer. The comonomers, maleic anhydride and alkenyl benzene, can be randomly or alternatingly distributed in the chain, however, it is preferred to have these comonomers alternating along the polymer backbone chain.

The poly(alkenyl benzene-co-maleic anhydride) has a molecular weight range between about 1,000 and up to about 500,000 or higher, more typically between about 10,000 and 500,000, and even more typically between about 20,000 and 150,000, where the molecular weight is number weight-average ("$M_w$").

The poly(maleimide-co-alkenyl benzene) of the present invention is formed by reacting a poly(alkyl benzene-co-maleic anhydride) in the presence of a mono-primary amine at a temperature from about 100° C. to about 300° C. and at a pressure from about slightly above vacuum to about 20 atmospheres, under substantially dry conditions. The reactants are preferably dry mixed in the absence of solvents in a suitable mixing apparatus such as a Brabender mixer equipped with Banbury blades. It is preferable to purge the mixer with nitrogen prior to the charging of the reactants. The primary amine may be added in a singular charge or in sequential partial charges into the mixer containing a charge of poly(alkyl benzene-co-maleic anhydride). Preferably the primary amine is charged in ratio between 0.8 to 1.0 of moles of amine per monomer contributed units of maleic anhydride in the poly(alkyl benzene-co-maleic anhydride).

Suitable primary amines include but are not limited to: alkyl amines; alkyl benzyl amines; alkyl phenyl amines; alkoxybenzyl amines; alkyl aminobenzoates; alkoxy aniline; and other linear primary amines containing from 1 to 50 carbon atoms, preferably 6 to 30 carbon atoms, in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are: hexylamine, octylamine, dodecylamine and the like.

The poly(maleimide-co-alkenyl benzene), prior to grafting with nylon, preferably has a molecular weight range between about 1,000 and up to about 500,000 or higher, more typically between about 10,000 and 500,000, and even more typically between about 150,000 and 450,000, where the molecular weight is weight-average ("$M_w$").

The polymer of the present invention may be prepared by any means well known in the art for combining such ingredients, such as blending, milling or internal batch mixing. A rapid and convenient method of preparation comprises heating a mixture of the components to a temperature of about 50° C. to about 290° C.

The polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed type Brabender mixer, extruding machine, kneader, continuous mixer, etc., is acceptable. The closed-type Brabender mixer is preferable, and mixing in an inactive gas environment, such as nitrogen or argon, is also preferable.

Grafting of nylon and poly(maleimide-co-alkenyl benzene) is performed by the reaction of the amine-terminated nylon polymer chains with the maleic anhydride group (trace amount) in the polymer chains.

Thus in the preferred embodiment the process for preparing the grafted polymer of this invention comprises the steps of:

(A) combining a commercially available poly [alkenylbenzene-(co)-(maleic anhydride)] and a primary amine under substantially dry conditions sufficient to react substantially most of the acid anhydride moieties to form the poly(maleimide-co-alkenyl benzene); and, (B) mixing a commercially available nylon with or without a diamine under substantially dry conditions of elevated temperature;

(C) adding the mass of step (A) to the mass of step (B), under condition of agitation sufficient to form the grafted polymer of the present invention and cooling; and, (D) adding an extender oil to the polymer of step (C) under conditions of agitation.

In broadest terms the process for preparing the grafted polymer of this invention comprises combining the poly (maleimide-co-alkenyl benzene) with nylon under conditions sufficient to permit grafting of at least a minor portion of the poly(maleimide-co-alkenyl benzene) onto the nylon. Thus the grafted polymer composition of this invention will comprise the reaction product of the above described poly (maleimide-co-alkenyl benzene) and the nylon. Apparently the primary amino groups of the nylon react to form covalent chemical bonds with the maleic anhydride groups of the poly(maleimide-co-alkenyl benzene). The nylon is thus grafted to the poly(maleimide-co-alkenyl benzene) through covalent chemical functional linkages.

The reaction can also be accomplished by combining solutions of the polymeric reactants in suitable solvents, such as benzene, toluene, and other inert organic and inorganic solvents, in a suitable reaction vessel under substantially anhydrous conditions. Heating will accelerate the reaction and is generally preferred. More preferably commercially, the reaction can be accomplished by premixing pre-formed pellets of the neat polymers and melt processing in a physical blender or mixer, such as a Brabender mixer or an extruder, at temperatures of from about ambient to about 350° C., preferably about 75° to about 300° C., and most preferably 150° C. to about 250° C. It is important that essentially all moisture or water be removed by drying prior to contacting the polymer reactants in order to avoid hydrolysis reactions which will compete with the sought cross linking and reduce the yield of the grafted copolymer composition of this invention.

The amounts of poly(maleimide-co-alkenyl benzene) and nylon reacted into the grafted compositions of the invention may vary somewhat depending upon the properties desired in the finished composition. In general, the amounts of nylon included in the grafted composition may range from about 1 to about 80 percent by weight based on total weight of composition. Preferred amounts of nylon range from 1 to 50 percent by weight with a particularly preferred range being from 1 to 30 percent by weight. The amounts of poly (maleimide-co-alkenyl benzene) polymer included in the grafted composition may range from about 99 to about 20 percent by weight based on total weight of composition with preferred amounts of the polymer ranging from 99 to 50 percent by weight with a particularly preferred range being from 99 to 70 percent by weight.

The polymer gels of the present invention have an extender added to the prepared grafted copolymers during final processing. Suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in the compositions of the present invention are low molecular weight organic materials having a number-average molecular weight of less than 20,000, preferable less than 10,000, and most preferably less than 5,000. Although there is no particular limitation to the material which may be employed, the following is a list of examples of appropriate materials:

(1) Softening agents, namely aromatic naphthenic and paraffinic softening agents for rubbers or resins;

(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;

(3) Tackifiers, namely coumarone resins, coumarone-indene resins, terpene phenol resins, petroleum hydrocarbons and rosin derivative;

(4) Oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;

(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and, (6) Petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used as extenders.

In accordance with the present invention, the grafted polymer containing gel composition of the present invention may have added thereto at least about 10 to about 10,000, preferably 30 to 1,000, parts by weight of extender per 100 parts by weight of the grafted copolymers. Most preferred amounts of added extender include from about 50 to about 500 parts of oil per 100 parts of grafted copolymer and ideally about 80 to about 300 parts of extender per 100 parts of grafted copolymer. The weight percent ratio of the grafted polymer to the extender is from about 10:1 to about 1:100, preferably from about 1:1 to about 1:5.

The polymer gels produced according to the present invention generally have high damping properties having a tan $\delta$ in the range of about 0.1 to about 1.0, preferably higher than 0.3 over the temperature range of 30° C. to 100° C., and a Shore A hardness ranging from 0 to about 50, preferably about 0 to about 30, most preferably about 0 to 20 at about 20° C. to 25° C. or at room temperature. The service temperature of the gels of the present invention is less than or equal to 100° C. For most of the polymers of the present invention, the 100° C. compression set of the gel is about 50. Some of the extended polymers of the present invention have a potential use up to 140° C.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additives or compounding ingredients per 100 parts of grafted copolymer.

A reinforcement may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4) polyisoprene-polystyrene block copolymers such as Hybler (produced by Kurare Inc.), polynorbornenes such as Norsorex (produced by Nippon Zeon Inc.) and the like. In this case the foregoing materials are equally applicable to the present polymer compositions.

The gels containing oil extended grafted poly(maleimide-co-alkenyl benzene)-nylon compositions of the present invention can be manufactured by mixing and dynamically heat-treating the components described above, namely, by melt-mixing. As for the mixing equipment, any conventional, generally known equipment such as an open-type mixing roll, closed-type Banbury mixer, extruding machine, kneader, continuous mixer, etc., is acceptable. The closed-type is preferable, and mixing in an inactive gas environment, such as nitrogen or carbon dioxide, is also preferable.

The composition obtained using the manufacturing method of this invention can be molded with equipment conventionally used for molding thermoplastics. It is suitable for extrusion molding, calendar molding, and particularly injection molding.

In summary, the molded polymers produced from the gels containing extended grafted poly(maleimide-co-alkenyl benzene)-nylon compositions of the present invention retain elastomeric characteristics and are useful in high temperature applications and/or high damping applications.

Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measurement of damping is the determination of a parameter called tan $\delta$. A forced oscillation is applied to a material at frequency f and the transmitted force and phase shift are measured. The phase shift angle delta is recorded. The value of tan $\delta$ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan $\delta$ vs. frequency by curve alignment. An alternate method is to measure tan $\delta$ at constant frequency (such as at 10 hz) over a temperature range. We have defined a thermoplastic unfilled material as useful for damping when tan $\delta$>~0.3 over at least a 4 decade range, preferably a 6 decade range of frequency.

It is further important that this high degree of absorption of energy be accompanied by good mechanical and thermal stability, as the part prepared from the subject polymers will be cycled through various environments and repeatedly subjected to various forces of compression, tension, bending, and the like.

The compositions of the present invention are favorably used in the manufacturing of any product in which the following properties are advantageous: a high degree of softness, heat resistance, decent mechanical properties, elasticity and/or high damping. The compositions of the present invention can be used in all industry fields, in particular, in the fabrication of automotive parts, tire tread rubbers, household electrical appliances, industrial machinery, precision instruments, transport machinery, constructions, engineering, and medical instruments.

Representative examples of uses of the extended graft polymers of the present invention are damping materials, vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes. Further, as super low hardness rubbers, these materials are applicable for use in appliances, damping rubbers, and as low hardness plastics, and it is preferable for molding materials. Further, because the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

Specific examples of uses of the compositions of the present invention as damping materials are as follows:

(1) in audio equipment, such as in insulators for a portable CD or a CD mounted on a vehicle, mike holders for home video cassette recorder, radio cassette recorder, karaoke and hand mikes, etc., an edge cone of a speaker, a tape holder of a radio cassette, a holder of a portable mini-disk player, an optical disk holder of a digital video disk, etc.;

(2) in information relating equipment, such as in insulators for a hard disk, insulators for motors such as a spindle motor for HHD and stepping motor, insulators for floppy disk drive, insulators for CD-ROM of personal computer, and a holder for optical disk;

(3) in communication equipment, such as in a holder for compact high performance mike or speaker of a portable telephone, a pocket bell or PHS, a mike holder for a wireless equipment, and a disk holder for portable note type electronic equipment;

(4) in home electronics equipment, such as in insulators for CD-ROM of home TV game, insulators for cassette holder or CD-ROM of cassette holder or game machine, a holder of high performance mike, and cone edge of speaker; and (5) in other applications, such as in damping materials for printer head of a wordprocessor, printer of personal computer, small or middle handy type printer, or name printers, and insulators for CD-ROM used for measure equipment.

In the following, the present invention will be described in more detail with reference to non-limitative examples. The following examples and tables are presented for purposes of illustration only and are not to be construed in a limiting sense.

EXAMPLE 1

Preparation of the Polymer

A nitrogen purged Brabender mixer (~300 gram capacity) equipped with a Banbury blade was initially set to 12 rpm and the temperature was set to 40° C. The mixer was then charged with 150 g of poly(styrene-alt-maleic anhydride) (obtained from Aldrich Chemical Company of 1001 West Saint Paul Avenue, Milwaukee, Wis. Catalog Number: 18,293-1, CAS Number: 9011-13-6)($M_n$=50,000) and 96 g of octyl amine (obtained from Aldrich, 99% purity). After 5 minutes of continuous mixing, the mixture was allowed to heat up at a rate of ~5° C./min. Once the temperature reached 150° C., agitation was discontinued. When the temperature reached 210° C., the heating element was set at isothermal conditions and agitation was again resumed increasing at a rate of 10 rpm/min until obtaining a speed of 70 rpm and mixing was continued for an additional 90 minutes. The agitation speed was then increased to 90 rpm for 30 minutes. The heating element of the mixer was turned off, and the polymer mass within the mixer was permitted to cool down to 160° C. at a rate of ~4° C./min. The agitation was then stopped and the polymer product mass was then removed from the mixer.

IR absorption peaks characteristic of the polymer mass were noted at 705 $cm^{-1}$, 1701 $cm^{-1}$, 1770 $cm^{-1}$, 2855 $cm^{-1}$ and 2926 $cm^{-1}$. DSC characteristic $T_g$ transition was broad, starting from −50 to 75° C. The glass transition temperature ($T_g$ was estimated to be at 50° C. The acid value of the polymer was 0.182 mg/g using the NaOH titration method in a tetrahydrofuran solution. The intrinsic viscosity of the polymer in tetrahydrofuran was 0.54.

EXAMPLE 2

Grafting of the Polymer and Nylon

A nitrogen purged Brabender mixer (~55 g capacity) equipped with a roller blade was initially set to 60 rpm and 200° C. The mixer was then charged with 12.5 g of commercial nylon-12 (from the Aldrich Chemical Company, $T_g$ of 37° C. and $T_m$ of 178° C.). After 5 minutes, a charge of 0.4 g of dodecane diamine (from Aldrich, purity=98%) was then added. After an additional 5 minutes a charge of 28 g of the polymer product of Example 1 was added to the mixer and the agitation speed was increased to 80 rpm. The polymers were agitated for an additional 10 minutes and the temperature was reset to 210° C., and the agitation speed was readjusted to 90 rpm. After 10 minutes, the heating element of the mixer was turned off and the agitation speed was again readjusted to 30 rpm. The mixture was permitted to cool to about 160° C. at a rate of ~4° C./min. Finally, agitation was discontinued and the grafted polymer product was removed from the mixer.

EXAMPLE 3

A charge of 17.1 g of the grafted polymer product of Example 2 was added to a Brabender mixer (55 g capacity) equipped with a roller blade and nitrogen purging. The mixer was initially set to 36° C. and 20 rpm. A charge of 17.2 g of di-tridecyl phthalate (DTDP) oil (from the C.P. Hall Company) was slowly added to the contents of the mixer. After 5 minutes, the temperature of the mixer was reset to 170° C. and the agitation speed was reset to 70 rpm. After 45 minutes of continuous mixing the temperature was adjusted to 180° C., and after 100 minutes later another charge of 10 g of DTDP oil was added to the contents of the mixer. The material was then further mixed for 150 minutes. The agitation was then discontinued and the product was removed from the mixer.

EXAMPLE 4

The procedure of Example 3 was repeated except for the use of a minor change in oils. A charge of 17.1 g of the grafted polymer product of Example 2 was added to a Brabender mixer (50 g capacity) equipped with a roller blade. A charge of 13.6 g of trioctyl phosphate (TOP) oil was slowly added to the contents of the mixer. A subsequent charge of 23.6 g of DTDP oil was added to the contents of the mixer in accordance with the procedure of Example 3. Both oils were obtained from the C.P. Hall Company.

The products of Examples 3 and 4 were thereafter molded into sheets and cylinder buttons at ~190° C. Ring samples were cut from these sheet for tensile measurements. The details of their physical properties are listed in the following Table 1:

benzyl amines; alkyl phenyl amines; alkoxybenzyl amines; alkyl aminobenzoates; and alkoxy aniline; containing from 1 to 50 carbon atoms in the alkyl and alkoxy substituents in the primary amine.

7. A polymer gel composition, comprising:
    a nylon grafted poly(alkenyl benzene-co-maleimide) comprising from about 20 wt % to about 99 wt % of a poly(alkenyl benzene-co-maleimide) having minor or trace amounts of maleic anhydride contributed monomer units and about 1 wt % to about 80 wt % of a nylon, and an extender in an amount sufficient to form a gel.

TABLE 1

| Example No. | Polymer used | Oil Type (61% content) | Nylon-12/ Polymer-$C_8$ (wt. ratio) | C.S.[1] (100° C.) | Th/Eb (psi / %) | Tan δ @ 5° C. | Tan δ @ 25° C. | Tan δ @ 45° C. | Shore A hardness (25° C.) |
|---|---|---|---|---|---|---|---|---|---|
| 3 | Example 2 | DTDP | 30/70 | 41–42 | 7.5/250 | 0.65 | 0.58 | 0.48 | 0–2 |
| 4 | Example 2 | DTDP/TOP | 30/70 | 56 | 1.8/108 | 0.52 | 0.48 | 0.34 | 0–2 |

[1]The Compression Set (C.S.) was measured based on conditions of ASTM D395-89, except that the sample size and displacement were changed as follows: Sample height - 0.5 inches; Sample diameter - 0.55 inches; Displacement - Sample is compressed to 0.375 inches and stored in an oven at 100° C. (or at 150° C. in subsequent examples) for 22 hours. The sample is removed from the oven, the stress on the sample is relieved, the sample is stored at room temperature for 30 minutes and the recovery of the sample is measured as the final sample height as X in: Compression Set = ((0.5 − X)/(0.5−0.375)) × 100%.

We claim:

1. A method for the formation of a high damping polymer, comprising:
    reacting from about 20 wt % to about 99 wt % of a poly(alkenyl benzene-co-maleimide) having minor or trace amounts of maleic anhydride contributed monomer units and about 1 wt % to about 80 wt % of a nylon under substantially dry conditions sufficient to form a nylon grafted poly(alkenyl benzene-co-maleimide) polymer, and mixing the nylon grafted poly(alkenyl benzene-co-maleimide) polymer with an extender in an amount sufficient to form a gel.

2. The method of claim 1, further comprising the step of: mixing said nylon grafted poly(alkenyl benzene-co-maleimide) and the extender in a weight percent ratio of said nylon grafted poly(alkenyl benzene-co-maleimide) to said extender of from 10:1 to about 1:100.

3. The method of claim 1, wherein the alkenylbenzene contributed monomer units of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

4. The method of claim 1, wherein the nylon is selected from the group consisting of:
    polycaprolactam (nylon-6), polylauryllactam (nylon 12), polyhexamethyleneadipamide (nylon-6,6), polyhexamethyleneazelamide (nylon-6,9), polyhexamethylenesebacamide (nylon-6,10), polyhexamethylene isophthalamide (nylon-6, IP), polyhexamethyleneterephthalamide (nylon-6, TP) and the condensation product of 11-aminoundecanoic acid (nylon-11) and mixtures thereof.

5. The method of claim 1 wherein the maleimide contributed monomer units of the poly(alkenyl benzene-co-maleimide) is formed by the reaction of maleic anhydride and a primary amine.

6. The method of claim 5 wherein the primary amine is selected from the group consisting of: alkyl amines; alkyl 8. The polymer gel composition of claim 7 wherein the weight percent ratio of said nylon grafted poly(alkenyl benzene-co-maleimide) to said extender is from about 1:1 to about 1:5.

9. The polymer gel composition of claim 7 wherein the weight percent ratio of said nylon grafted poly(alkenyl benzene-co-maleimide) to said extender is from about 10:1 to about 1:100.

10. The polymer gel composition of claim 7, wherein the monomer for forming the alkenyl benzene moiety of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

11. The polymer gel composition of claim 7, wherein the nylon is selected from the group consisting of: polycaprolactam (nylon-6), polylauryllactam (nylon 12), polyhexamethyleneadipamide (nylon-6,6), polyhexamethyleneazelamide (nylon-6,9), polyhexamethylenesebacamide (nylon-6, 10), polyhexamethylene isophthalamide (nylon-6, IP), polyhexamethyleneterephthalamide (nylon-6, TP) and the condensation product of 11-aminoundecanoic acid (nylon-11) and combinations thereof.

12. The polymer gel composition of claim 7, wherein the gel has damping properties having a tan δ in the range of about 1 to about 0.3 over the temperature range of 30° C. to 100° C.

13. The polymer gel composition of claim 7, wherein the gel has a Shore A hardness ranging from about 0 to about 50 at about 20° C. to 25° C.

14. The polymer gel composition of claim 7, further comprising from 1 to 350 parts of a inorganic filler, additive or compounding ingredient based on 100 parts by weight of the grafted copolymer composition component.

15. The polymer gel composition of claim 7, wherein the extender is at least one compound selected from the group consisting of: softening agents, plasticizers, tackifiers, oligomers, lubricants, petroleum hydrocarbons, silicone oil, aromatic oil, naphthenic oil and paraffinic oil.

16. A vibrational damping composition comprising the polymer gel composition of claim 7.

17. A tire tread composition comprising the polymer gel composition of claim 7.

18. An automotive bumper composition comprising the polymer gel composition of claim 7.

* * * * *